United States Patent
Marczynski

(10) Patent No.: US 8,707,888 B2
(45) Date of Patent: Apr. 29, 2014

(54) ROTATION INDICATOR

(75) Inventor: Michael Marczynski, Kirkby Lonsdale (GB)

(73) Assignee: Business Lines Limited, Carnforth (GB)

( * ) Notice: Subject to any disclaimer, the term of this patent is extended or adjusted under 35 U.S.C. 154(b) by 511 days.

(21) Appl. No.: 12/736,279

(22) PCT Filed: Mar. 24, 2009

(86) PCT No.: PCT/GB2009/050273
§ 371 (c)(1),
(2), (4) Date: Sep. 24, 2010

(87) PCT Pub. No.: WO2009/118550
PCT Pub. Date: Oct. 1, 2009

(65) Prior Publication Data
US 2011/0011331 A1 Jan. 20, 2011

(30) Foreign Application Priority Data
Mar. 25, 2008 (GB) .................................. 0805352.2

(51) Int. Cl.
*G01D 13/22* (2006.01)
(52) U.S. Cl.
USPC .......................................................... 116/328
(58) Field of Classification Search
USPC ................. 411/8, 9, 14, 372.5; 116/317, 328;
160/10; 7/153; 220/214
See application file for complete search history.

(56) References Cited

U.S. PATENT DOCUMENTS

| | | | |
|---|---|---|---|
| 3,967,773 A * | 7/1976 | Kaufmann | 229/101.1 |
| 5,085,332 A * | 2/1992 | Gettig et al. | 215/249 |
| 5,350,266 A | 9/1994 | Espey et al. | |
| 6,321,624 B1 | 11/2001 | Croton et al. | |
| 6,398,312 B1 * | 6/2002 | Marczynski et al. | 301/35.622 |
| 6,561,124 B1 | 5/2003 | Marczynski et al. | |

FOREIGN PATENT DOCUMENTS

GB    2 325 505    11/1998

* cited by examiner

*Primary Examiner* — Daniel S Larkin
*Assistant Examiner* — Irving A Campbell
(74) *Attorney, Agent, or Firm* — Ladas & Parry LLP

(57) ABSTRACT

A rotation device for a wheel nut comprising a body having a bore formed with equi-spaced grooves enabling the device to be releasably but non-rotatably secured to the wheel nut in one position of a plurality of positions, and a cap which fits removably into or onto one end of the body to close off the bore. The cap comprises a means to indicate the rotational position of the device relative to a reference. So that the height of the body may be chosen to allow it to extend through a raised wheel trim, but not project too far above, the body is formed at its end to which the cap fits with at least one removable top section strip, which may be delimited by respective continuous notches around the periphery of the body at the interior and/or exterior thereof.

10 Claims, 3 Drawing Sheets

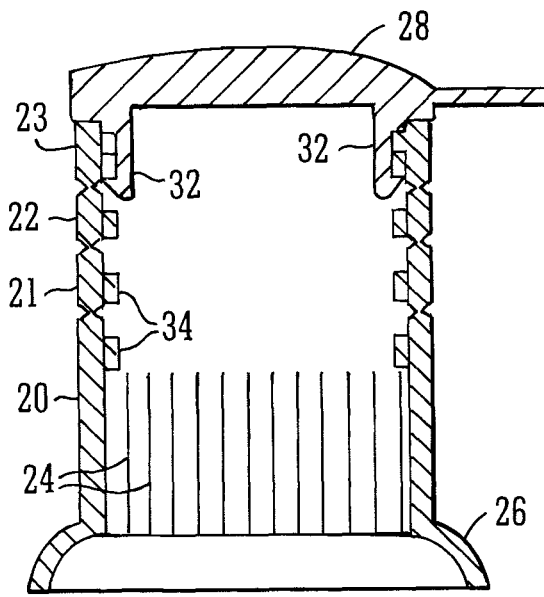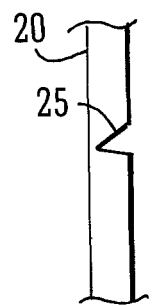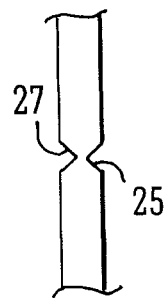
FIG. 3  FIG. 4A  FIG. 4B
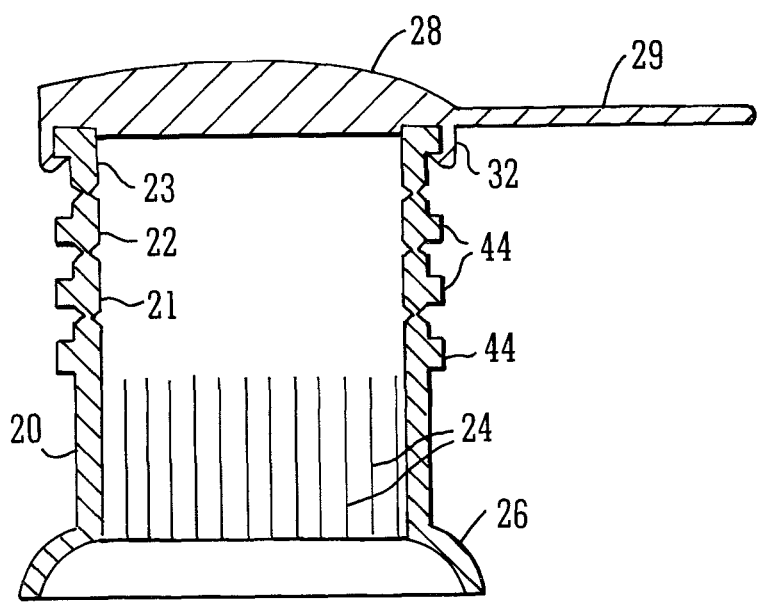
FIG. 5

ROTATION INDICATOR

This application is a 371 of PCT/GB2009/050273 filed on Mar. 24, 2009.

The present invention relates to a rotation indicator for a wheel nut comprising a body having a bore formed with equi-spaced grooves enabling the device to be releasably but non-rotatably secured to the wheel nut in one position of a plurality of positions, and a cap which fit removably into or onto one end of the body to close off the bore, the cap being provided with indicator means to indicate the rotational position of the device relative to a reference.

Devices of this type, with a pointer extending laterally from the cap as indicator means, are described in the applicant's earlier patent specification GB 2325505. When the body is fitted over a hexagonal wheel nut any rotation of the nut, i.e. any loosening of same, will be indicated by movement of the pointer away from a particular initial position which may be towards a marker or towards an adjacent similar indicator on an adjacent wheel nut. Such devices, particularly variants which have an integral end closure and pointer rather than a removable cap, are widely used on the rims of vehicle wheels as a safety measure to indicate any loosening of any of their wheel nuts.

A particular version of the above device, commercially available as "Dustite (registered trade mark) Long Reach", is designed for use on the wheel nuts of wheel rims which are fitted with a raised trim. Such a device is illustrated in FIG. 1. It has an elongated body 10 with a flared base 16 and a removable cap 12 with an indicating pointer 14 so that it can be fitted to extend through the wheel trim with the pointer 14 remaining above the trim. FIG. 2 shows the cap 12 from above at the right hand side and from below at the left hand side showing the external splines 30 which enable it to fit non-rotatably into the internally splined body 10.

However, because wheel trims are of varying height, sometimes the pointer 14 stands excessively proud of the wheel trim. In other cases, the height of the "Dustite LR" body 10 is insufficient for it to reach down to the wheel nut to fit there over.

An object of the present invention is to provide a device which obviates these problems.

The present invention provides a rotation indicator having the features mentioned in the first paragraph above, but differing from the known devices in that the body is formed at its end to which the cap fits, with at least one removable top section strip.

Preferably, the body is formed, at its end to which the cap fits, with at least two adjacent successively removable top section strips.

Then, in order to match the height of the trim above the rim and mount the pointer just above the trim, but not too far above, with the body of the indicator snugly fitted over the wheel nut below, the required number of top section strips can be readily removed by nicking and tearing off. The cap can then be attached to the remaining body which includes any remaining top section strips.

The body of the indicator device is typically moulded from polyethylene or polypropylene or other suitable plastics material. That being so, the or each top section strip can be delimited in a manner permitting easy tear off by a respective continuous notch around the periphery of the body at the interior and/or exterior thereof. The tearing off can be initiated by snicking the relevant top section with a sharp tool or blade, or by provision of a tab which can be gripped manually, in the manner now common on containers for edible oils and condiments and the like.

Also, for secure, yet removable fitting the cap may be provided with catch means, such as plural barbs or a rim with an inturned lip having an inclined contact surface and the body formed with at least one undercut shoulder onto which the barbs or lip engage. Several such shoulders may be formed, on each removable top section and on an upper margin of the remaining body so that the cap can be secured appropriately irrespective of the number of top sections which are removed. Such shoulders may be formed internally, in the bore of the body, or externally of the body. The latter may be easier to accomplish in manufacture of the device by conventional moulding techniques.

The invention will be described further, by way of example, by reference to the accompanying drawings, in which:

FIG. 3 is a schematic cross-sectional side view of a first embodiment of an indicator device in accordance with the present invention;

FIGS. 4a and 4b are enlarged sectional details showing two possible configurations of weak points for the removable top sections;

FIG. 5 is a schematic cross-sectional side view of a second embodiment of an indicator device in the present invention.

Figure 1:
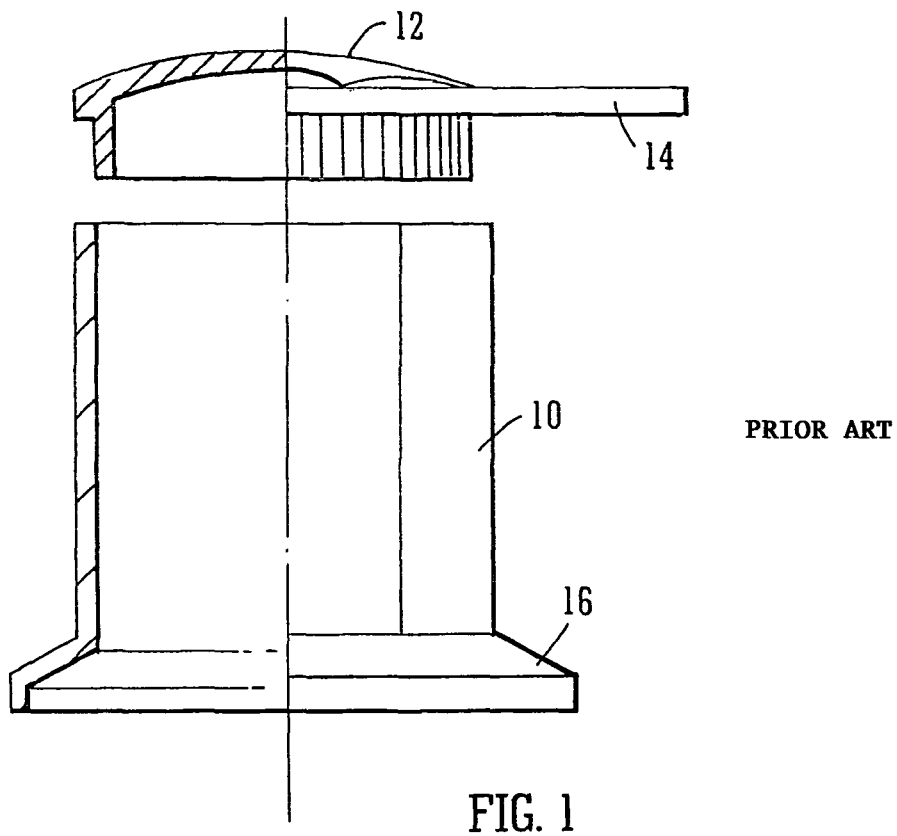
FIG. 1 is a half sectional side view of a prior art "Dustite Long Reach" device as already described.
Figure 2:
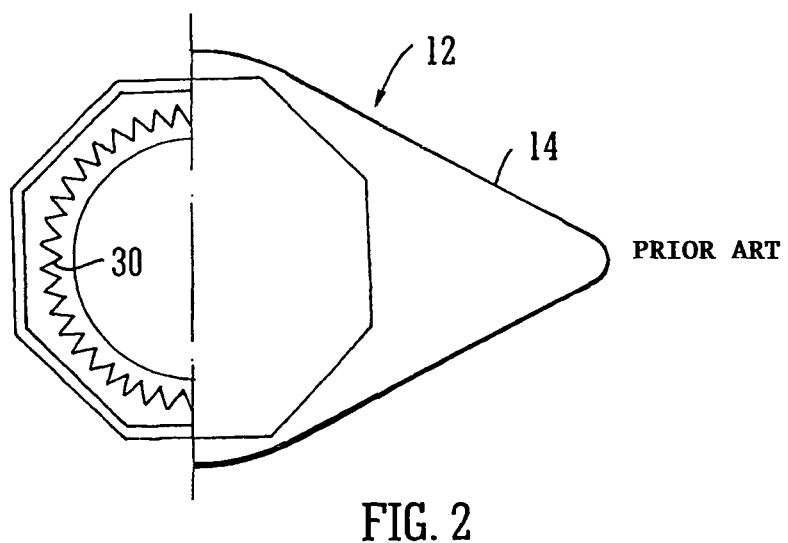
FIG. 2 is a half plan, half underside view of the cap in the prior art device of FIG. 1, as already described.

As shown in FIG. 3 a first practical embodiment of the device of the invention comprises a generally cylindrical body 20 having a bore formed with a plurality of equi-spaced grooves or splines 24 and having a flared skirt 26 at one end, for fitting over a wheel nut in a removable, non-rotatable manner in any selected rotational position. The body 20 has three removable top section strips 21, 22, 23, each delimited by weak points formed by annular notches or grooves 25, 26 in the material of the body 20. FIG. 4a shows one option where a single notch or groove 25 which extends across a major portion of the material width may be provided. FIG. 4b shows an alternative option where facing notches or grooves 25, 26 cut in from both the inner and outer surfaces of the body 20 may be provided. In either case, the body 20 together with any or all of the top sections 21, 22, 23 maintains sufficient tensile strength across the notches in a direction longitudinal of the body wall so the body retains its rigidity in use. However, each strip 21, 22, 23 can quite easily be separated along the line of the respective notches or grooves 25, 26 by a tearing force transverse to the body wall, initiated by nicking or snicking the notch.

The device also comprises a cap 28 with a projecting pointer 29, as in the prior art device. However, the cap 28 has additional projecting barbs 32, shown also in the modified device of FIG. 6, which engage as a snap fit behind shoulders provided by ledges 34 inside the bore of the body 20. A respective ledge and shoulder 34 is formed on each top section strip 21, 22, 23 and on an upper region of the remaining body 10, in the FIG. 3 embodiment. In modified embodiments if longer barbs are provided then shoulders on only some of the proximal strips or inside the upper region of the body may be needed.

Figure 6:
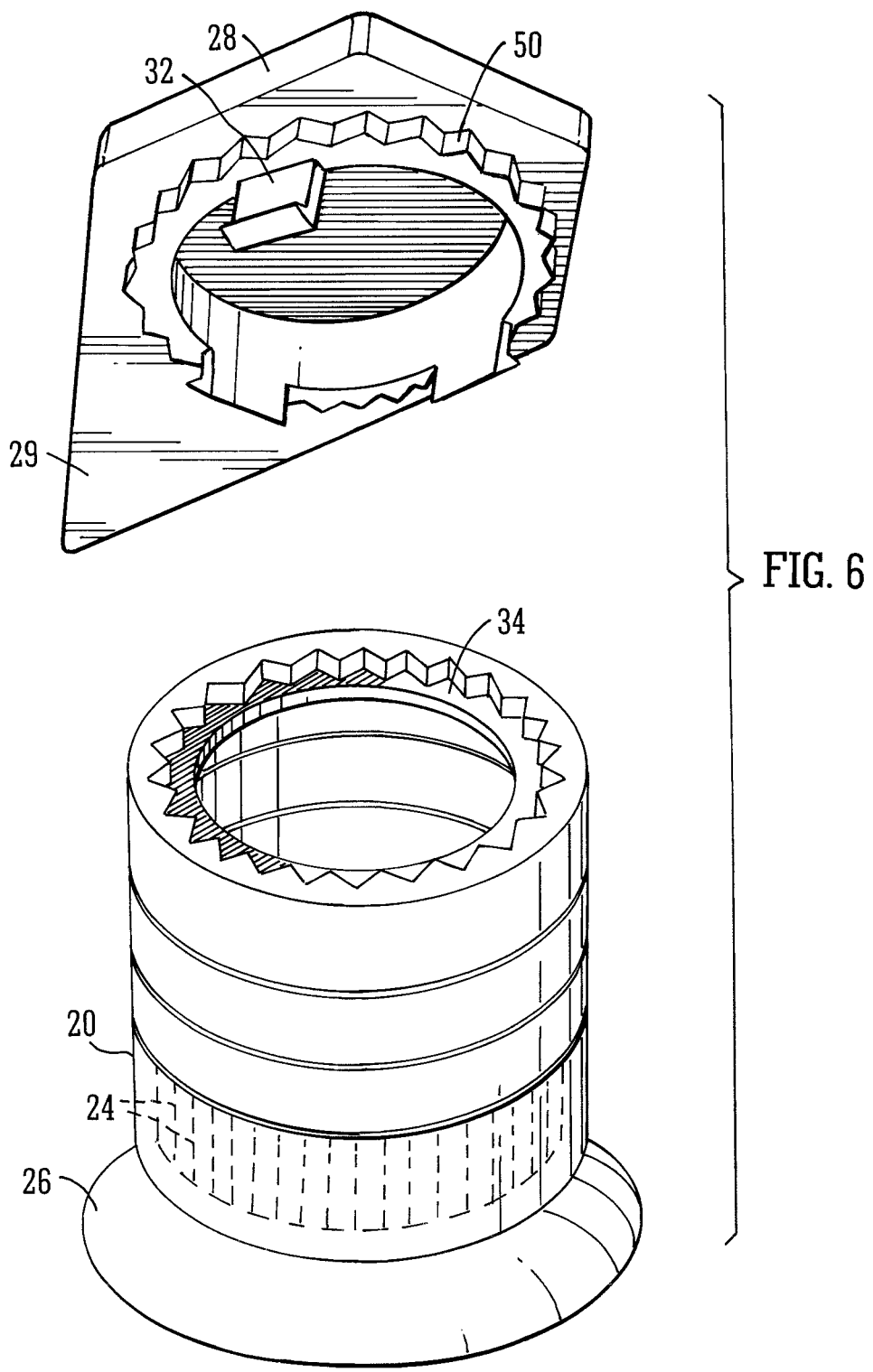
FIG. 6 is a perspective view of a third embodiment, similar to the first embodiment sketched in FIG. 3, showing the cap removed and inverted.

FIG. 5 shows a preferred practical embodiment which differs from the embodiments shown in FIGS. 3 and 6 only in that the body 20 is formed with ledges, providing shoulders 44, on the exterior of the body instead of inside the bore. This is easier to mould in the production process. The barbs 32 on the cap 28 are then correspondingly formed to project outside the body for engagement with these shoulders 44.

In either type of embodiment the individual barbs 32 could be replaced by a continuous rim with an interned lip, of taper profile to effect the securement of the cap to the body.

The cap 28 may be moulded of the same plastics material as the body with the pointer integral. However, it may be of a particular plastics material which is susceptible to being chrome plated as chrome plated indicators are aesthetically desirable in some markets. Alternatively, the cap could be made entirely of metal.

In other embodiments of cap a projecting pointer could be replaced by a pointer depicted on the top surface of the cap.

As with the known "Dustite Long Reach" device the cap is preferably provided with plural grooves or splines 50 on an external surface of a depending annular flange to engage non-rotatably in a corresponding grooved/splined upper region of the bore (see FIG. 6). However, other non-rotatable means of releasable cap fitment are also possible within the scope of the invention. In particular, in embodiments where the cap is made of metal it may have peripheral teeth which are releasable by pressing on the top centre of the cap to slightly deform the cap. Also, such peripheral teeth may have serrated edges to ensure adequate gripping to the plastics body so that non-rotation of the cap when fitted to the body is assured.

The foregoing is illustrative and not limitative of the scope of the invention and variations in detail are possible in other embodiments. In particular, the number of the removable top sections may vary, being one, two, three or more.

The invention claimed is:

1. A rotation indicator device for a wheel nut comprising:
a body having a bore formed with equi-spaced grooves enabling the device to be releasably but non-rotatably secured to the wheel nut in one position of a plurality of positions, and
a cap which fits removably into or onto one end of the body to close off the bore, the cap comprising an indicator to indicate the rotational position of the device relative to a reference,
wherein the body is formed, at its end to which the cap fits, with at least one removable top section strip.

2. A rotation indicator device according to claim 1 wherein the body is formed, at its end to which the cap fits, with at least two adjacent successively removable top section strips.

3. A rotation indicator device according to claim 1 wherein the top section strip is delimited by a respective continuous notch around the periphery of the body at the interior and/or exterior thereof.

4. A rotation indicator device according to claim 1 wherein the indicator provided on the cap is in the form of a pointer.

5. A rotation indicator according to claim 4 wherein the pointer projects laterally from the body.

6. A rotation indicator device according to claim 1 wherein the bore of the body is formed with an undercut shoulder and the cap is formed with a catch means for engagement with the undercut shoulder.

7. A rotation indicator according to claim 6 wherein the undercut shoulder is formed on a removable top section strip.

8. A rotation indicator device according to claim 1 wherein the body is formed externally with an undercut shoulder and the cap is formed with a catch means for engagement with the undercut shoulder.

9. A rotation indicator according to claim 8 wherein the undercut shoulder is formed on a removable top section strip.

10. A rotation indicator device according to claim 1 wherein the body, including the removable top section strip, and the cap are each formed with a plurality of equally spaced grooves for purposes of releasable yet non-rotatable engagement of the cap onto or into the body in any of a plurality of selectable positions.

* * * * *